April 3, 1956 A. M. DAVIS 2,740,300
TWO-PIECE GUIDED ACTUATOR MECHANISM
Filed March 13, 1952 3 Sheets-Sheet 1
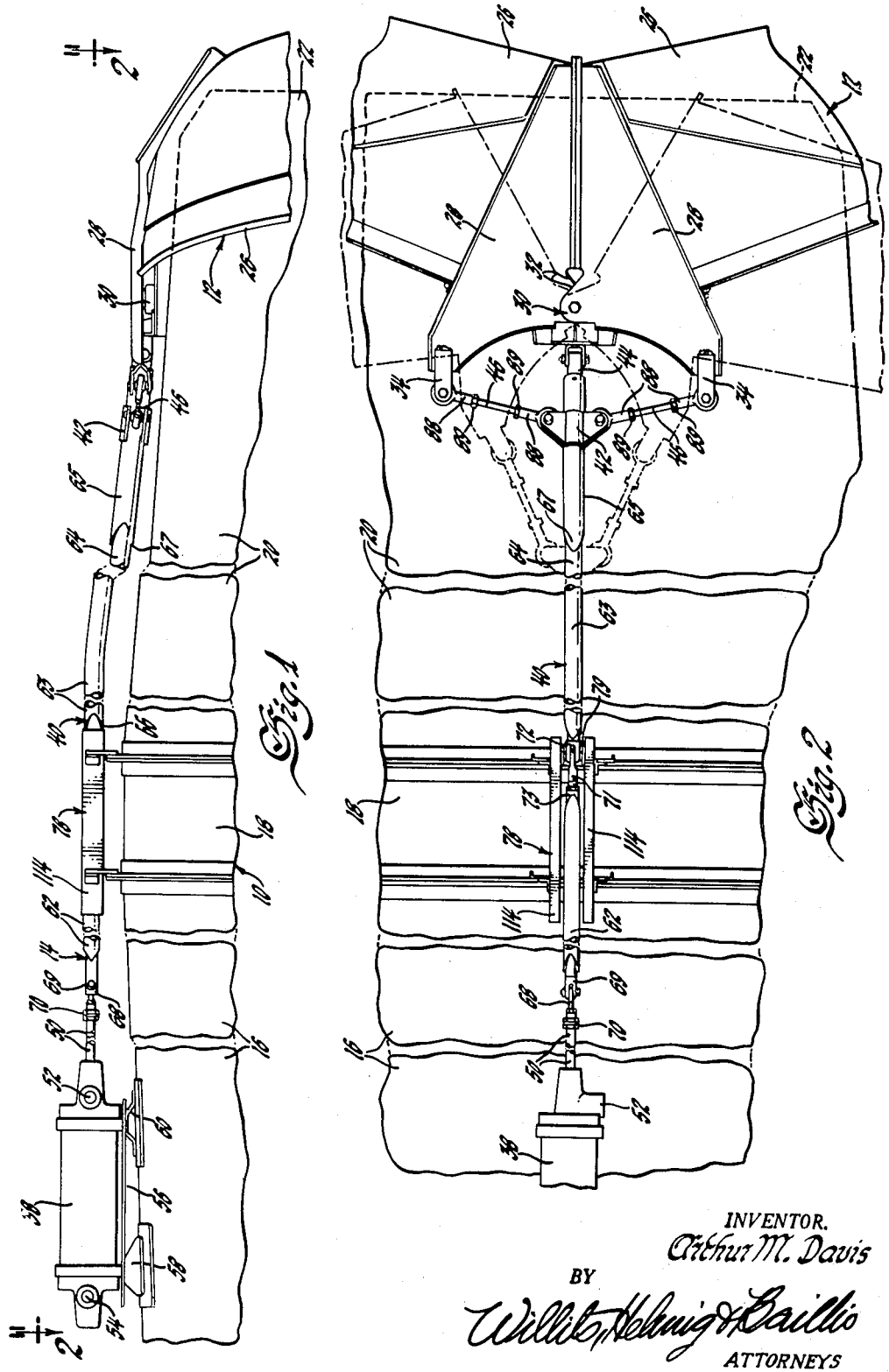
INVENTOR.
Arthur M. Davis
BY
Willits, Helwig & Baillio
ATTORNEYS

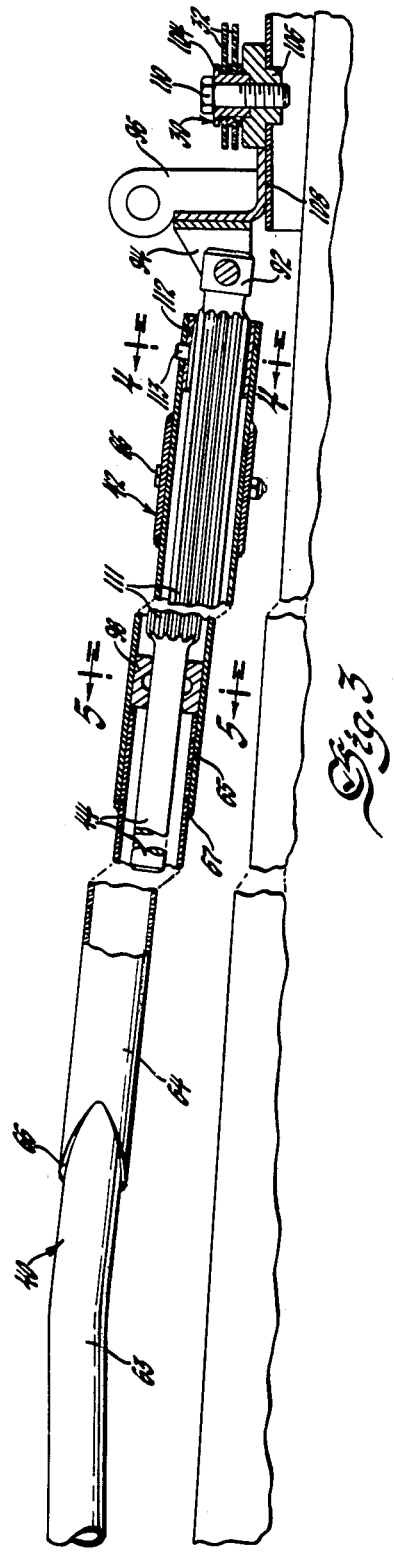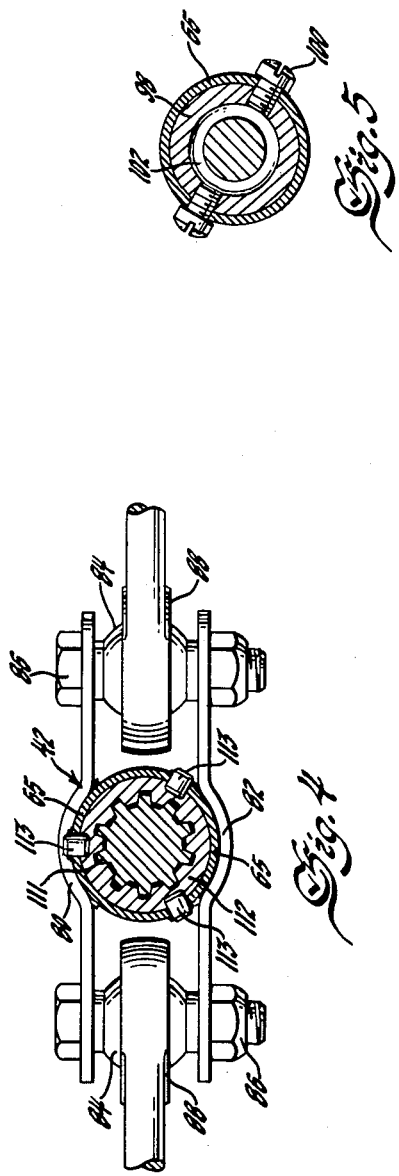

April 3, 1956  A. M. DAVIS  2,740,300
TWO-PIECE GUIDED ACTUATOR MECHANISM
Filed March 13, 1952  3 Sheets-Sheet 3

INVENTOR.
Arthur M. Davis
BY
Willits, Helwig & Baillio
ATTORNEYS

United States Patent Office 2,740,300
Patented Apr. 3, 1956

2,740,300

TWO-PIECE GUIDED ACTUATOR MECHANISM

Arthur M. Davis, Indianapolis, Ind., assignor to General Motors Corporation, Detroit, Mich., a corporation of Delaware Application March 13, 1952, Serial No. 276,335

4 Claims. (Cl. 74—110)

This invention relates to variable propulsion nozzles for use with jet propulsion engines and, more particularly, to operating mechanisms for actuation of variable area jet nozzle devices.

It has been generally recognized that the operating characteristics of jet propulsion engines, such as gas turbine jet engines, may be improved by the provision of means for varying the area of a jet nozzle, and many structural arrangements for this purpose have been proposed.

The present invention is directed to an improved operating mechanism for the actuation of variable propulsion nozzles of the adjustable flap or visor type commonly employed on afterburner turbojet installations wherein a pair of opposed flaps or visors are pivotally mounted on a diameter of a jet pipe to vary the area of the gas jet orifice.

In certain afterburner installations, the afterburner may be of considerable length and may be of greater diameter at its mid-section than at either of the ends thereof. The power for moving the visors, also called the eyelids, of the variable nozzle may be supplied from an actuating motor, which is mounted on the afterburner, through an operating mechanism which may include a guided thrust member that is driven by the motor and coupled to the eyelids by connecting links. Since the afterburner operates at high temperatures, the actuating motor is generally mounted near the forward or inlet end of the afterburner where the temperature of the skin or shell is lowest and cooling is more feasible. The thrust member thus required is of considerable length and must, in many cases, be jointed or bent by reason of the shape of the afterburner.

The thrust member or actuating rod is of considerable length, and, in one direction of movement, is in compression. In order to have sufficient rigidity to stand the compressive load, if unsupported, it must be of very heavy construction. Such heavy construction is, of course, extremely undesirable in aircraft engines. In addition to operating loads on the thrust rod, maneuvers of the aircraft may place additional transverse loads tending to deflect the rod. Such deflections of an actuating rod are undesirable also in that they may give rise to undue side thrust on the connecting rod of the cylinder, increase the frictional loads on the mechanism, and reduce the accuracy of control of the visors.

Considerable force is required to move the visors, and it is most desirable to employ as light a motor as practicable, and to minimize the weight and the friction of the mechanism connecting the motor to the visors and to provide an actuating linkage which is of as little weight as possible.

In accordance with my invention, a lightweight actuating rod connected between the motor and the eyelids is articulated to avoid side thrust on the cylinder and to accommodate the connecting linkage to the generally barrel-shaped afterburner casing; and the actuator rod is positively guided at a point intermediate its ends so that it is restrained against deflections or buckling due to tensile or compressive stresses in the connecting member and to transverse acceleration. It will be understood that the structure of the invention is also highly beneficial in installations in which the connecting rod between the cylinder and eyelid is straight.

Accordingly, the present invention has for its principal object the provision of an actuating member mechanism for jet nozzle flaps in which a lightweight connecting structure couples the flaps to an actuating motor and the interconnecting structure is guided so as to prevent distortion due to forces applied thereto. Other objects are to provide a simple, efficient, and inexpensive jet nozzle eyelid operating mechanism that is rugged, light in weight, and smooth and reliable in operation.

The above and other objects, together with the features and advantages attending the invention, will appear more fully from the following description and drawings, wherein:

Fig. 1 is a broken elevation view of an afterburner installation for a turbojet engine equipped with a variable area jet nozzle and an operating mechanism therefor in accordance with a preferred embodiment of the invention;

Fig. 2 is a plan view thereof taken in the direction indicated by the line 2—2 of Fig. 1;

Fig. 3 is a broken elevation view, partly in section of a part of the operating mechanism;

Figure 6:
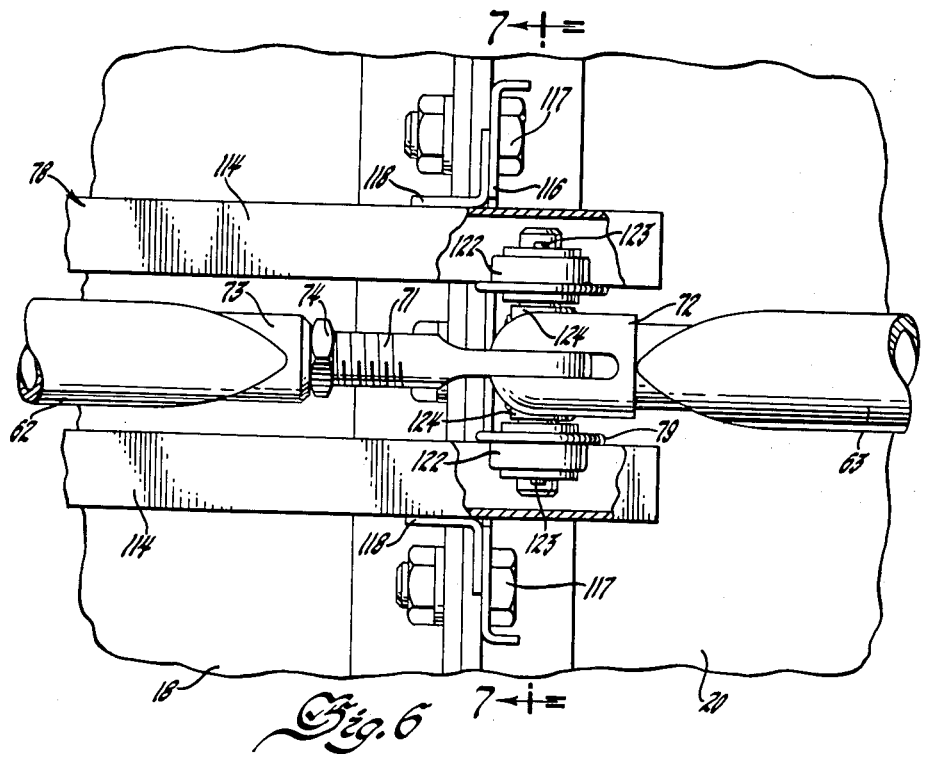

Figs. 4 and 5 are transverse sectional views taken in the planes 4—4 and 5—5, respectively, of Fig. 3;

Fig. 6 is an enlarged plan view of a part of the operating mechanism; and

Figure 7:
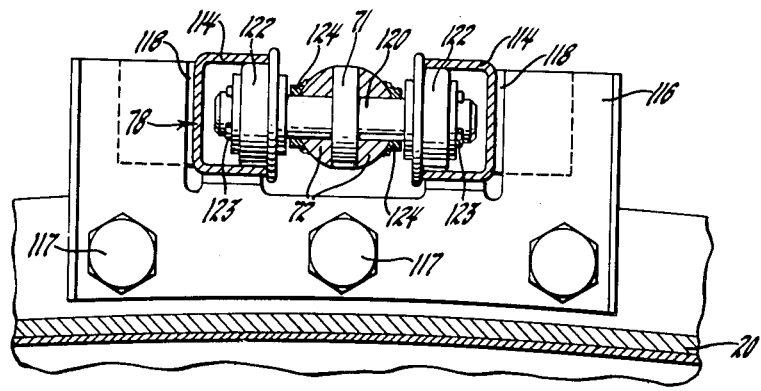

Fig. 7 is a transverse sectional view taken in the plane indicated by the line 7—7 of Fig. 6.

Referring to the drawings, Fig. 1 illustrates an afterburner 10 for a turbojet engine equipped with a variable area jet nozzle 12 and an operating mechanism 14 in accordance with a preferred embodiment of the invention. The remainder of the engine is not illustrated because the structure of such engines is well known and the details of the engine are immaterial to the invention.

The afterburner 10 is of a known type, and comprises, in general, an afterburner diffuser section 16, a burner assembly 18, and a combustion section 20 terminating in a fixed converging outlet nozzle 22, all of which are secured together to form an elongated, substantially barrel-shaped assembly which is fixed to the turbine exhaust pipe of a turbojet engine in known manner.

The variable nozzle 12 is of the known adjustable visor type and comprises, in general, a pair of opposed visors or eyelid members 26 each shaped in the form of a segment of a spherical zone and having a substantially triangular bracket 28 welded or otherwise secured to the ends thereof as shown in Fig. 2. The eyelids 26 are rotatably mounted on pivot arrangements, one of which is indicated at 30, extending through a pair of aligned ears 32 formed in one corner of each eyelid bracket 28.

Brackets 34, formed in or secured to another corner of each of the eyelid brackets 28, are provided to form clevises for attachment thereto of one end of a connecting link 46 which forms a part of the operating mechanism to be described. The pivots 30, which extend from the wall of the section 20 of the afterburner assembly 10, are aligned with a diameter thereof and define an axis of rotation normal to the axis of the engine. The eyelids are shown in their closed position in which the opening between them is a minimum, and may be swung outwardly about the pivots over the fixed nozzle 22 to enlarge the jet nozzle orifice as shown in dashed outline in Fig. 2.

The operating mechanism 14 comprises a pair of actuating assemblies (only one of which is shown) which are mounted on opposite sides of the afterburner assembly 10. Each of the actuating assemblies comprises a motor 38, a thrust rod assembly 40, a fitting 42 secured to the rod 40, a fixed inner guide rod 44 (Fig. 3), and a pair of connecting links 46 connected between the fitting 42 and brackets 34 of the eyelid members 26.

The actuator motor 38 is preferably of the cylinder and piston type, the piston rod 50 of which extends through one end of the cylinder. Ports 52 and 54 at opposite ends of the cylinder are provided for the purpose of supplying air or other fluid thereto to move the piston. The cylinder 38 is mounted on a heat shield 56 that is spaced and supported from the hot shell of the afterburner diffuser section 16 by saddle support brackets 58 and 60 as shown in Fig. 1.

As best shown in Fig. 2, the thrust rod 40 is an assembly composed of several sections of rod, a straight forward section 62, a bent mid-section 63, and a straight rear portion formed by successive tubular sections 64, 65. The sections 63, 64 and 65 are united by welded scarf joints 66, 67 (Figs. 1 and 3). The forward section 62 may be of tubular form and is flexibly connected with the piston rod 50 of the motor 38 by eye and clevis joints 68, 69, the eye 68 of which is threaded into the end of the piston rod 50 and the clevis 69 welded or otherwise secured to the forward end of the rod section 62. Two hexagon nuts 70 are provided on the end of the piston rod to limit the forward stroke of the piston. The bent mid-section 63 of the rod assembly may also be of tubular form and is flexibly connected with the forward section 62 by eye and clevis joints 71, 72 (Fig. 6) that is guided in a track and roller arrangement 78, 79, the construction and purpose of which will be described. The eye 71 is threaded into the end of a threaded nipple 73 (Fig. 3) welded to the end of the rod section 62 and locked thereto by a jam nut 74 while the clevis 72 is welded to the adjacent end of the mid-section 63 of the thrust rod assembly as shown.

The fitting 42 is preferably welded to the rear section 65 of the thrust rod assembly. As shown in Fig. 4, the fitting comprises a pair of spaced laterally extending plates 80 and 82 welded to opposite sides of the tubular rod section 65 to form a pair of clevises, each of which receives a ball joint 84 connected thereto by a bolt and nut 86 as shown. Each of the ball joints 84 is associated with a socket formed by an eye fitting 88 provided at each of the threaded ends of each of the connecting links 46 of Fig. 2. Similar ball joint fittings are provided between the brackets 34 on the eyelids 26 and the connecting links 46. The connecting links 46 are threaded into the ends of the eye fittings 88 which are locked thereto by jam nuts 89 (Fig. 1). Adjustment of the length and position of the thrust rod assembly and connecting links are facilitated by the threaded fittings employed therein.

As best shown in Figs. 3 and 4, the inner rod 44 of the actuating assembly is coaxial with and extends into so as to telescope within the interior of the tubular rear section 65 of the thrust rod. The inner rod 44 has an integrally formed head 92 at one end thereof attached to a clevis 94 on a bracket 96 adjacent the eyelid pivot arrangement 30. The forward end of the fixed inner rod 44 passes through a pilot bushing 98 (Figs. 3 and 5) within the interior of the rear section 65 of the actuator or thrust rod assembly so as to aid in guiding the latter in its longitudinal movement relative thereto. The bushing 98, which is preferably of a graphite composition, is secured within the rear section 65 of the actuator rod by cap screws 100 and is formed with an annular groove 102.

The pivot arrangement for the eyelids is best shown in Fig. 3. Each of the pivot arrangements comprises a flanged sleeve 104 which passes through the ears 32 of the eyelid brackets 28 and is received in a recess in a nut 106 that is welded to a raised channel platform member 108 welded to or formed in the surface of the afterburner combustion section 20 and serves to provide a plane mounting surface for the eyelid pivots parallel to the axis of the engine. The sleeve 104 is inserted with the eyelids assembled in place as shown and is retained by a bolt 110 which passes through the sleeve and is received in the nut 106. The support bracket 96 is welded to the platform member 108 so as to be integrally connected with the eyelid pivot.

Since the connecting links 46 are coupled to the fitting 42 at points displaced from the axis of the rod section 65, the forces required to close the eyelids tend to twist the fitting 42 and rod section 65 around the axis of the tubular shaft. To prevent such twisting, interengaging means of complementary cross-section, preferably in the form of a spline 111 (Fig. 3) formed on the fixed inner rod 44 and a splined bushing 112 secured in the end of the thrust rod section 65, are provided between the guide rod 44 and the movable outer rod assembly. The splined bushing 112 may be fixed in the rod section by dowel pins 113 extending therebetween as shown in Fig. 4. By reason of the shape of the interengaging portions of the outer and inner rods, they are positively interlocked against relative rotary movement but not against relative longitudinal movement. Smooth and reliable operation of the operating mechanism is thus insured and binding of the elements of the operating mechanism is eliminated.

The aforementioned track and roller arrangement 78, 79 is provided to guide the junction between the forward section 62 and the inclined mid-section 63 of the actuator rod assembly and to prevent radial and transverse bending or buckling of the thrust rod assembly. The track comprises a pair of laterally spaced channels 114 supported near both ends thereof by a pair of longitudinally spaced support plates 116 that are suitably secured as by bolts 117 to the flanges at the ends of the burner section 18 of the afterburner assembly. The outer central portion of each support plate is cut out as shown to permit the channels 114 to extend therethrough. The tracks are secured to the support plate by angle brackets 118 which are welded to the web of each channel track 114 and to the support plate 116.

The roller arrangement comprises a transverse pin 120 (Fig. 7), which extends through the eye 71 and clevis 72 of the articulated joint between the forward and mid-sections 62, 63 of the thrust rod assembly so as to be journaled therein, and a pair of flanged rollers 122 rotatably mounted on opposite ends of the pin 120 and maintained thereon by cotter pins 123 as shown in Figs. 6 and 7. The pin 120 passes through a pair of short sleeves or bushings 124 (Fig. 6) welded to opposite sides of the clevis 73 which serve to prevent lateral displacement of the actuator rod assembly. The rollers are mounted to coact with the flanges of the channel tracks 114 as shown in Fig. 7, so that radial and lateral forces are taken by the track to hold the thrust rod sections in proper alignment.

There is thus provided a lightweight operating mechanism that is appropriately supported and guided and wherein side thrust on the piston of the actuating motor tending to cause binding of the movable parts of the operating mechanism and radial and transverse forces tending to cause buckling and deflection of the thrust rod are eliminated.

It is to be understood that the above described arrangement is but illustrative of the application of the principles of the invention and that numerous other arrangements may be devised by those skilled in the art without departing from the spirit and scope of the invention.

I claim:

1. In combination, a drive motor, support means spaced from said motor, an elongated thrust rod assembly aligned with and located between said motor and said support means, said thrust rod assembly including a first section of rod connected to be driven by said motor, a second section of rod pivotally joined to said first section of rod and a first guide means at the junction of said rod sections restraining transverse movement thereof, and a second guide means secured to said spaced support means and extensibly coupled to said second section of rod.

2. The combination in accordance with claim 1 above wherein said first guide means at the junction of said rod sections includes track means surrounding said rod sections on opposite sides thereof in the vicinity of said junction and roller means on said thrust rod sections in rolling contact with said track means.

3. In combination, a reciprocable drive motor, support means spaced from said motor, an elongated thrust rod assembly aligned with and located between said motor and said support means, said thrust rod assembly including a first section of rod connected to be driven by said motor, a second section of rod, a transverse connecting pin pivotally joining said rod sections and a first guide means at the junction of said rod sections, and a second guide means secured to said spaced support means and extensibly coupled to said second section of rod, said first-mentioned guide means including track means extending longitudinally of said rod sections and located on opposite sides thereof in the vicinity of said junction and roller means rotatably mounted on said transverse connecting pin and in rolling contact wtih said track means.

4. The combination in accordance with claim 3 above wherein said track means comprises a pair of laterally spaced facing channel members having flanges directed toward said rod sections and said roller means are in rolling contact with said flanges of said channel members.

References Cited in the file of this patent
UNITED STATES PATENTS

| | | |
|---|---|---|
| 699,995 | Whitney | May 13, 1902 |
| 860,174 | Whitney | July 16, 1907 |
| 1,005,473 | Rennerfelt | Oct. 10, 1911 |
| 2,328,918 | McManus | Sept. 7, 1943 |
| 2,523,842 | Oulianoff | Sept. 26, 1950 |
| 2,551,372 | Haltenberger | May 1, 1951 |